(12) United States Patent
Walker

(10) Patent No.: US 7,240,571 B2
(45) Date of Patent: *Jul. 10, 2007

(54) ON-BOARD SCALE SENSOR WITH MECHANICAL AMPLIFICATION AND IMPROVED OUTPUT SIGNAL APPARATUS AND METHOD

(76) Inventor: Robert R. Walker, 201 S. Congress, Rushville, IL (US) 62681

( * ) Notice: Subject to any disclaimer, the term of this patent is extended or adjusted under 35 U.S.C. 154(b) by 82 days.

This patent is subject to a terminal disclaimer.

(21) Appl. No.: 10/954,540

(22) Filed: Sep. 30, 2004

(65) Prior Publication Data

US 2006/0070463 A1 Apr. 6, 2006

(51) Int. Cl.
*G01L 1/04* (2006.01)
(52) U.S. Cl. ............................................... 73/862.627
(58) Field of Classification Search ........... 73/862.627, 73/862.632, 862.637
See application file for complete search history.

(56) References Cited

U.S. PATENT DOCUMENTS

| | | | | |
|---|---|---|---|---|
| 4,331,035 A | * | 5/1982 | Eisele et al. ................... 73/765 |
| 4,549,439 A | * | 10/1985 | Keen et al. ............ 73/862.627 |
| 4,566,553 A | * | 1/1986 | McCutcheon ............... 180/237 |
| 4,589,669 A | * | 5/1986 | Kedem ..................... 280/43.12 |
| 4,694,921 A | * | 9/1987 | Johnston ...................... 177/136 |
| 4,879,657 A | * | 11/1989 | Tamura et al. ............... 701/110 |
| 4,899,599 A | * | 2/1990 | Eddens ................... 73/862.382 |
| 5,327,791 A | | 7/1994 | Walker ................... 73/862.628 |
| 5,540,296 A | * | 7/1996 | Strothmann ................. 180/19.3 |
| 5,811,738 A | * | 9/1998 | Boyovich et al. ............ 177/136 |
| 5,932,848 A | * | 8/1999 | Gordon ................... 177/210 R |
| 5,965,849 A | * | 10/1999 | Ikoma ......................... 177/136 |
| 6,092,838 A | | 7/2000 | Walker ......................... 280/735 |
| 6,172,309 B1 | * | 1/2001 | Lockery ...................... 177/211 |
| 6,684,718 B2 | * | 2/2004 | Muraishi ............... 73/862.474 |
| 6,755,087 B2 | * | 6/2004 | Clegg ..................... 73/862.639 |
| 2005/0045797 A1 | * | 3/2005 | Davies et al. ................ 248/650 |
| 2005/0081649 A1 | * | 4/2005 | Takahashi ............... 73/862.474 |

\* cited by examiner

*Primary Examiner*—Max Noori
(74) *Attorney, Agent, or Firm*—Husch & Eppenberger LLC; Robert C. Haldiman

(57) ABSTRACT

A system for sensing the load carried in a structural member by attaching a load cell to a neutral axis of bending. Small deflections along an arc of bending create a desirable signal level via mechanical amplification. A load sensor is adapted for mounting on an axle that deviates from a neutral axis when under a load. The load sensor comprises a reaction portion adapted for mounting on the axle and an active portion adapted for mounting to at least two points along the axle. The active portion has an amplifier arm and at least one sensor element. The sensor element is attached at a first end to the reaction portion and the sensor is attached at its second end to the amplifier arm. At least one strain gauge is mounted on the sensor element. At least one flexion web is attached to the reaction portion and to the active portion. When a load is put on the axle, flexion of the axle moves the active portion relative to the neutral axis of the axle, the active portion moves the amplifier arm, causing a curve to be formed in the sensor element, the curve being of sufficient magnitude to be calibrated by the at least one strain gauge.

18 Claims, 9 Drawing Sheets

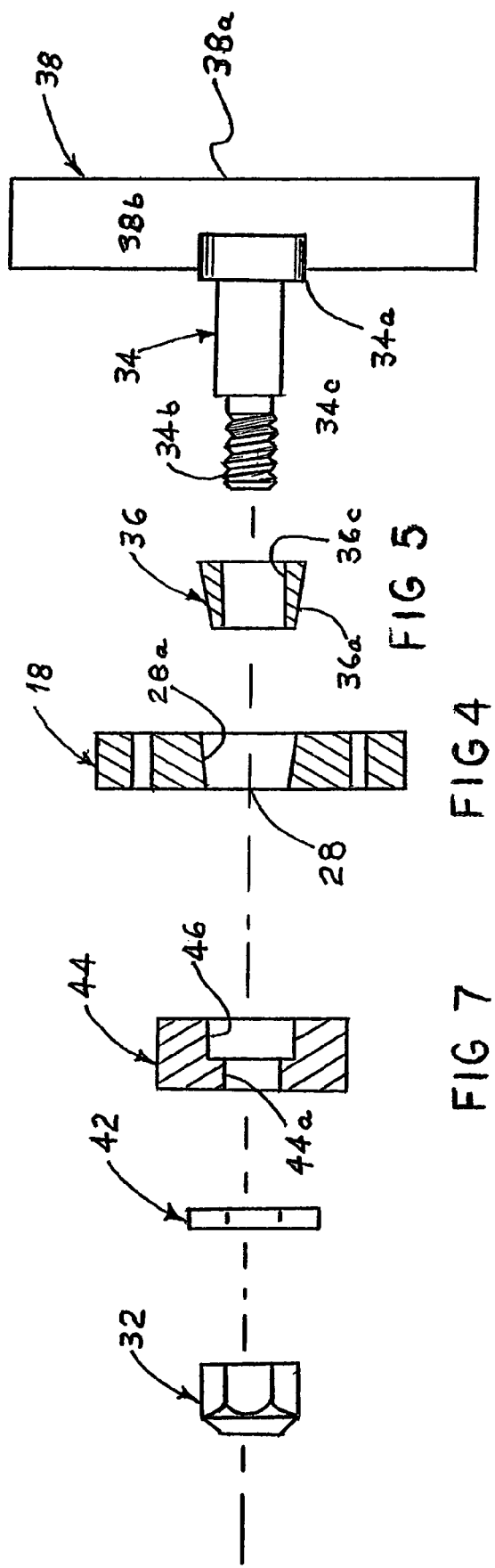

DEAD WEIGHT TEST

8" New Design Beam

| Time | Applied Load (Lbs) | Reading (Micro-Strain) | Reading with Dial Gauge | Deflection (inches) |
|---|---|---|---|---|
| 3:10 | 0 | 0 | 31 | − .0003 |
|  | 1 | 99 | 128 | .0000 |
|  | 6 | 594 | 624 | .0010 |
|  | 11 | 1090 | 1122 | .0022 |
|  | 16 | 1585 | 1616 | .0033 * |
|  | 0 | 0 | 31 | − .0003 |

\* Compared to other beams at this deflection

DEAD WEIGHT TEST

8" Beam with 1-3/16 Center Hole

| Time | Applied Load (Lbs) | Reading (Micro-Strain) | Reading with Dial Gauge | Deflection (inches) |
|---|---|---|---|---|
| 3:53 | 0 | 0 | 5 | .0000 |
| | 1 | 14 | 19 | .0003 |
| | 6 | 90 | 95 | .0007 |
| | 11 | 165 | 170 | .0010 |
| | 16 | 241 | 246 | .0015 |
| | 21 | 316 | 320 | .0020 |
| | 26 | 392 | 392 | .0023 |
| | 37.3* | 562* | - | .0033* |
| | 0 | 0 | 5 | .0000 |

\* Calculated from 26 pound data point

DEAD WEIGHT TEST

8" Mini Dog Bone Beam

| Time | Applied Load (Lbs) | Reading (Micro-Strain) | Reading with Dial Gauge | Deflection (inches) |
|---|---|---|---|---|
| 3:35 | 0 | 0 | 0 | .000 |
| | 1 | 89 | 112 | .0010 |
| | 3.77* | 335 | - | .0033* |
| | 6 | 533 | 577 | .0053 |
| | 11 | 976 | 1000 | .0099 |
| | 16 | 1420 | 1444 | .0145 |
| | 0 | 2 | | .000 |

\* Calculated from 6 pound data point

STRAIN GAUGE SIGNAL PROCESSING

LEGEND: T = TENSION, C = COMPRESSION

ON-BOARD SCALE SENSOR WITH MECHANICAL AMPLIFICATION AND IMPROVED OUTPUT SIGNAL APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

Installing on-board sensor beams at the neutral axis of bending of a load bearing member such as a truck drive axle or front axle is disclosed by the U.S. Pat. No. 5,327,791 to Walker, 1992.

The prior art design, with four (4) mounting points, secures a "dog bone" shaped sensor beam sufficiently enough to force it to bend with the load bearing structure. Its neutral axis corresponds to that of the load bearing structure and follows its arc of bending.

Although very useful in the truck scale industry this technique has limitations. Its size limits its utility. For example: current 12 inch long beams must straddle spring attachment U-bolts to find a suitable installation location. This spacing away from the drive axle housing necessitates tall weld brackets (up to 1¼ inches). There is a need for a new design that would reduce the size (length) of sensor beam to increase utility. An 8 inch long sensor beam would install inboard of U-bolts and outboard of the drive axle banjo.

Its relatively low output signal limits noise reject and hinders weight resolution. There is a need to increase the output signal of the sensor beam by some mechanical amplification technique. Simply shortening a beam significantly reduces its output signal. However, making a sensor beam longer would increase its output signal but would also further limit its utility.

There is a need to review hardware being used in sensor beam installation to improve proximity of the sensor to the load bearing member. There is a further need to reduce shear and bending forces on mounting bolts or studs to improve linearity and zero return of installed sensors.

The aforementioned arc approximates a circular function for the center section of a front axle between the spring mounts. The arc of bending for a drive axle is exponential in character, i.e., deflection increases an amount that is more than proportionate to the distance from the drive axle centerline as that distance increases. In both of the above situations, the deflection available to drive the sensor is only 0.005 inches for prior art sensor beams. It is even less for shorter sensor beams. Because existing neutral axis sensor beams reside in a low deflection zone with respect to load bearing members, there is a need for some multiplying or amplifying factor to facilitate a new design.

SUMMARY OF THE INVENTION

It is in view of the above problems that the present invention was developed. It is therefore the primary objective of the present invention to provide an improved sensor beam with increased utility due to reduced size and increased output signal proportional to load due to mechanical amplifications. The placement of sensors along the no stress neutral axis of bending in primary structures preserves the safety factor of earlier technology. The present invention does not utilize a constant bending center section for the sensor beam and, in fact, performs well in both constant bending and exponential stress fields supported by primary structure.

The sensor beam is installed by attachment brackets and welding, contiguous with an axle's neutral axis, which is a reasonably straight line during no load conditions. As load is applied to the axle with the installed sensor beam, an arc of bending in the axle is generated and enters the sensor beam via right side mounting hardware that rotates the right end of the sensor beam clockwise.

This action moves the center web of the sensor beam upwards and above the arc of bending. The left end of the sensor beam contains the third or reaction mounting point, which pulls the sensor beam left end back down to the arc of bending. The aforementioned differential motion is connected by a sensing element. The sensing element, equipped with four strain gauges, deforms in compound bending thereby activating all four strain gauges proportional to load. A wheatstone bridge wiring, amplifier, power source and digital indicator provide calibration of the sensed load.

Laboratory testing has revealed that if one end of a sensor beam is released from attachment, the opposite end with its two (2) mounting points will cause the beam to function as a tangent line with respect to the arc of bending. As bending increases, the free end of the sensor beam moves a substantial distance from the arc.

A reaction point is isolated near the extreme free end of the sensor beam. A void is created adjacent thereto. This member needs to be stabilized dimensionally with two (2) outboard flexures along the sensor's length. These flexures are soft in bending support, but stiff in torsion or length supports.

If the reaction point is pulled down to the arc of bending, it is easily noted that a significant displacement disparity exists across the aforementioned void. If the reaction point is released, it will return to the centerline of the sensor beam.

The last element of the system is a thin connective beam between the reaction point and the remaining outboard end of the beam. This sensing element is flat and straight in the unloaded condition. When the complete assembly is subjected to compliance with an arc of bending, the sensing element will bend into a shallow figure "S" or compound bending pattern. The shape supports four (4) strain gauge locations at four (4) locations, two tension and two compression. When wired into a classic wheatstone bridge circuit, all four gauges contribute to the output signal equally. Three (3) alternate sense element configuration are disclosed as follows:

FIG. 10 splits the center beam into two (2) elements, top and bottom, with ½ of the element height in each beam. This approach retains the flexibility of the single beam and adds the possibility of a strain gauging pocket that could easily be waterproofed.

The FIG. 11 two holes version with an abbreviated center beam is stiffer but exhibits very high output signal.

The FIG. 12 hole in the beam creates a top tension bar and a bottom compression bar. By testing it was determined that this is somewhat stiffer than the double reacted bending element but exhibits good output signal. Like FIG. 10, it is suitable for easy waterproofing.

The load cell disclosed and claimed herein may be advantageously deployed in any motor vehicle, including trucks, agricultural vehicles such as grain carts, or it may be used on static moment arms such as building beams, bridge beams, elevator supports or earthquake sensitive structural components. Structural members that may be measured include but are not limited to: truck axles, truck frame members, truck walking beams, conveyor rails and train tracks.

Further features and advantages of the present invention, as well as the structure and operation of various embodiments of the present invention, are described in detail below with reference to the accompanying drawings.

BRIEF DESCRIPTION OF THE DRAWINGS

FIG. 4 is an enlarged cross section of the sensor beam taken along line 4—4 of FIG. 3, which passes through tapered hole 28.

FIG. 5 is an enlarged cross section view of the tapered bushings of the systems.

FIG. 6 is a front end elevated view of the tapered bushing taken from the left side of FIG. 5.

FIG. 7 is an enlarged cross section view of one of the recessed spacer elements of the system of FIG. 1.

FIG. 8 is a rear end elevated view of the recessed spacer element taken from the right side of FIG. 7.

FIG. 9 is an enlarged side elevation view of the bolt and weld bracket assembly of the system of FIG. 1. FIGS. 4 through 9 constitute an exploded view of the assembly sequence: of one of three attach points for the sensor beam in FIGS. 2 and 3.

DETAILED DESCRIPTION OF THE PREFERRED EMBODIMENTS

The disclosure of U.S. Pat. No. 5,327,791, issued on Jul. 12, 1994, for a, "Vehicle Beam Load Measuring System," is hereby incorporated by reference. The entire disclosure of U.S. Pat. No. 6,092,838, issued on Jul. 25, 2000, for a, "System and Method for Determining the Weight of a person in a Seat in a Vehicle," is also hereby incorporated by reference.

Figure 1:
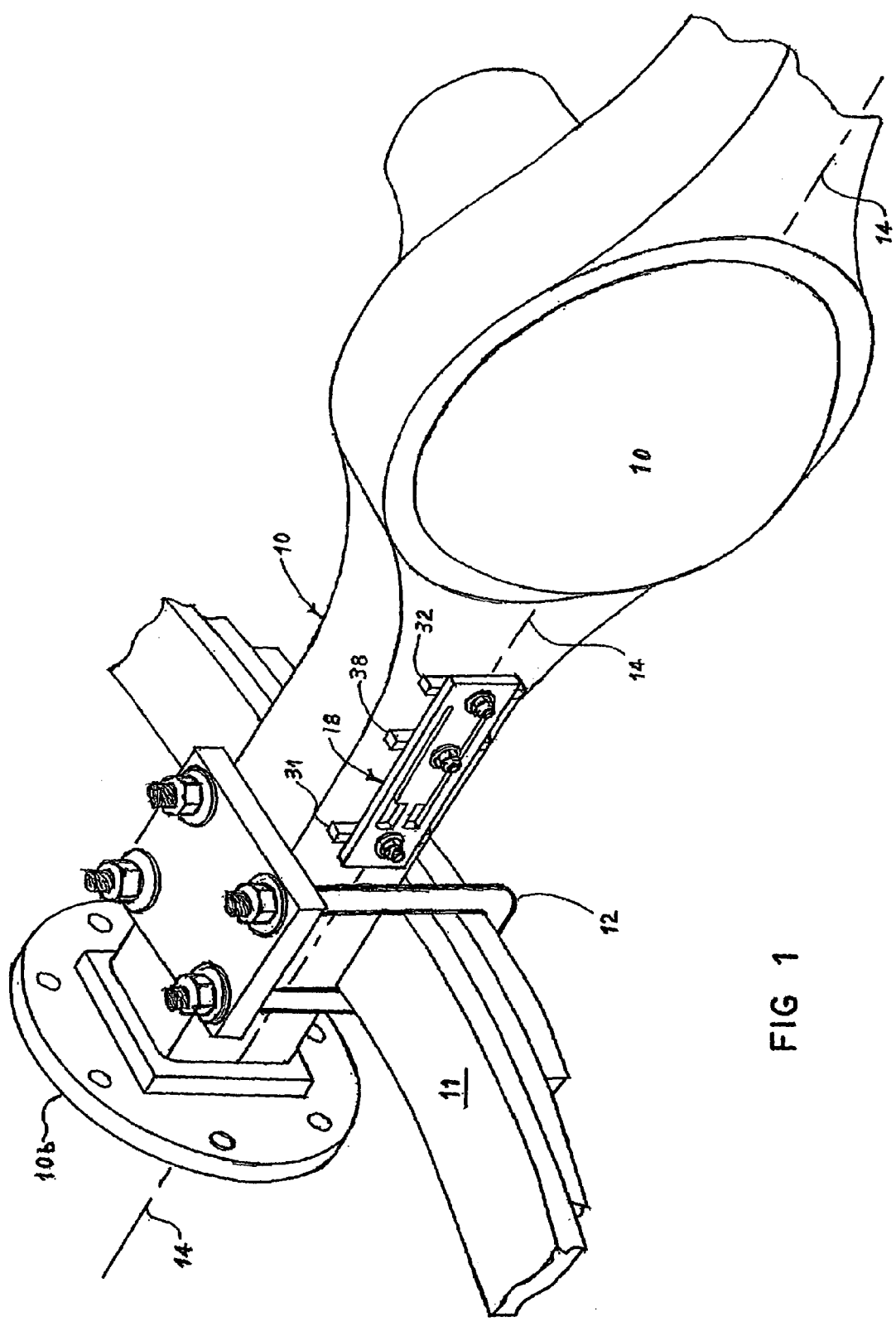
FIG. 1 is an isometric view of a portion of a truck axle with U-bolt mounted leave spring, depicting the installation of the load sensing system of the present invention.

FIG. 1 illustrates the preferred embodiment of a new sensor beam invention for installation on load bearing members of vehicles such as drive axles, front axles, walking beams or frame rails. The FIG. 1 example places the sensor beam 18 on drive axle housing 10 at the neutral axis of bending 14, which is also typically a welded seam in said housing. Sensor Beam 18 is located just inboard of spring U-bolt 12 attaching spring 11 and outboard of the circular flange of differential housing 10, typically known as the "Banjo." Sensor beam 18 is physically attached to weld brackets 31, 32 and 38, which attach to housing 10. The brake plate attachment 10b is shown for clarity of placement of sensor beam 18 only.

Figure 2:
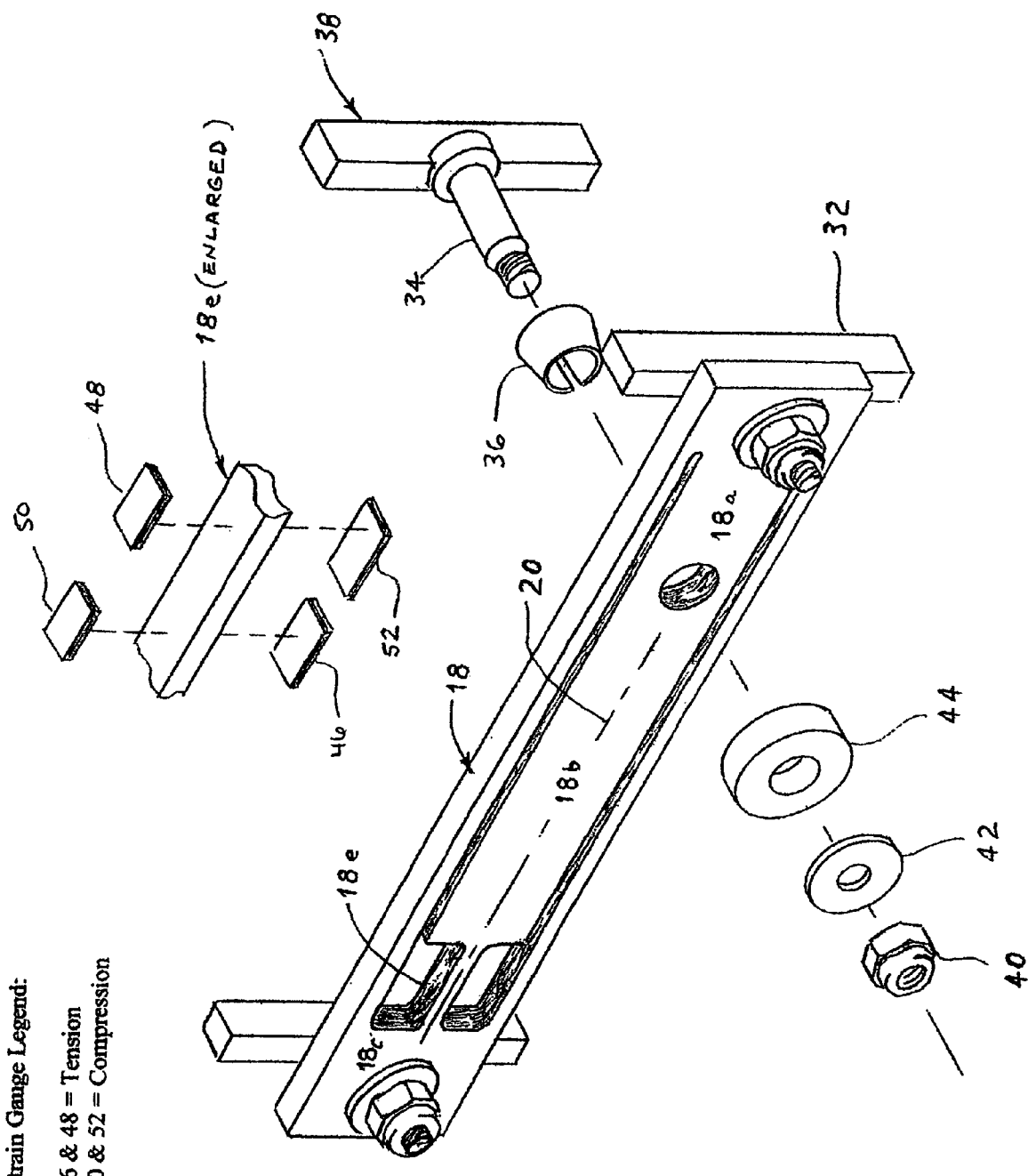
FIG. 2 is an enlarged isometric view of sensor beam portion of the system with an exploded view of the mounting hardware and a further enlargement of the sensing element with strain gauge locations.

FIG. 2 is a perspective view of sensor beam 18 with an exploded view of attachment hardware and further enlargement of sensing element 18e. Four strain gauges 46, 48, 50, and 52, are located on sensing element 18e as noted with gauges 46 and 48 on top of sensing element 18e and gauges 50 and 52 on the lower side.

A sensor beam can be formed from a wide variety of commercially available metals. The depicted embodiment uses 17-4 PH stainless steel bar stock. The length of the depicted embodiment does not exceed 8 inches; the width does not exceed 2 inches, and a stock thickness is as small as ¼ inch.

Sensor beam 18 has a force driven pair of holes 18a at the right hand end. This is the active portion of the load sensor. The center portion of sensor beam 18 is a stiff web 18b that extends to the left to connect to sensing element 18e. This is the amplifier arm.

The remaining left hand portion of sensor beam 18 is the reaction section 18c which contains the third attachment hole.

The material surrounding the third mounting hole to be stabilized from possible rotation by two long flexure beams emanating from the right end of the sensor beam and created by two machined slots running the length of the flextures. The third mounting hole has the capability and purpose of pulling the left end of the sensor beam down to the arc of bending while forcing the sensing element into compound bending.

The exploded view of mounting hardware starts on the right with weld, bracket assembly 38. Tapered bushing 36 slips on to assembly 38 with the small end of the bushing outboard. A tapered hole in the sensor beam passes over tapered bushing 36. Backup washer 44 passed over the protruding end of assembly 38 with its recessed side against sensor beam 18. Washer 42 and lock nut 40 complete the assembly. After weld brackets 30, 38 and 32 are positioned and welded to housing 10, three each lock nuts 40 are torqued to a value of 200 inch pounds.

The present configuration allows a shorter beam to be used, making it more adaptable, quicker and easier to mount. By way of example and comparison to prior designs depicted, sensor beam 18 could be eight inches in length rather than twelve inches in length. Height and thickness of sensor beam 18 need only be appropriately adaptable for mounting on various axles.

Figure 3:
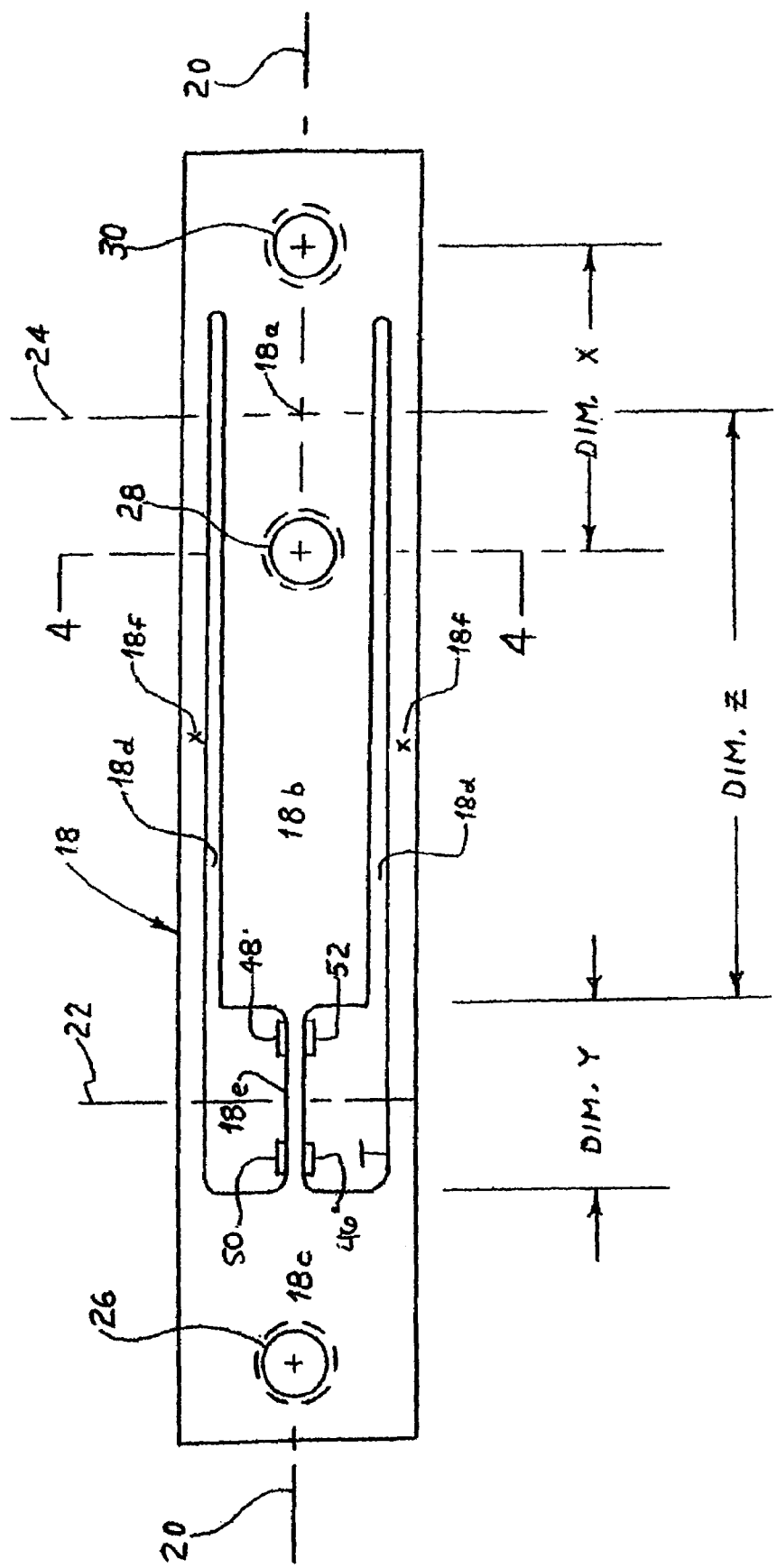
FIG. 3 is enlarged plan view of the sensor beam of the system of FIG. 1, with dimensional references.

FIG. 3 is a plan view of sensor beam 18. Horizontal center line 20 corresponds to the neutral axis of bending of load bearing members, like 14 on housing 10, which sensor beam 18 will be attached to. The loaded axle will deform with its center convex downward, towards the roadway. During loading of housing 10, neutral axis 14 will bow down in the center, forming an arc below center line 20. When said arc occurs, hole 28 will follow the arc and move relative to hole 30. This clockwise rotation of area 18a at the intersection of center lines 20 and 24 will cause web 18b to rotate its outboard end. In doing so, web 18b will cause a force on the right hand end of sensing element 18e. While the aforementioned motion is occurring at 18a and 18b, area 18e is being retained by mounting hole 26. Area 18c provides a reaction point for the left hand end of sensor element 18e, thereby causing element 18e to reverse bend, which means that strain gauge locations 46 and 50 will see tension stress at the gauge interface and strain gauges 46 and 52 will see compression stress at the gauge interface.

By way of clarification, if sensing element 18e were a simple bending beam, being clamped at one end and simply supported at the other end, it would have tension stress all across the upper surface and compression all across the lower surface. Sensing element 18e is, however, clamped at both ends.

Reaction area 18c and attachment hole 26 could function without further stabilization, but would have to rely on the relatively weak sensing element 18e to keep it from rotating. To provide desirable positional stability to area 18c, two outer perimeter stabilizing webs 18f are added by cutting two slots 18d. This closing of the outer perimeter of sensor beam 18 adds physical protection and stabilizes the entire system during periods of thermal expansion or contraction along center line 20.

Holes 26, 28 and 30 lie along center line 20. They each have a four and one half degree taper with the large diameter inboard to accommodate tapered bushing 36 in FIG. 2.

Holes 28 and 30 that generate the driving force in the system are separated by Dimension X. This dimension defines the active portion of the load sensor. This dimension is ineffective below 1.5 inches and sacrifices output signal above 2 inches. In the depicted embodiment, this dimension is 1.90 inches. Dimension Y is the length of sensing element 18e. As Dimension Y is increased, the signal level from gauges 46, 48, 50 and 52, mounted on sensing element 18e, goes down. Conversely, as Dimension Y is shortened, signal levels go up. A value for dimension Y above 1.2 to 1.5 inches is counterproductive and a value smaller than 0.5 inches makes installing strain gauges difficult and costly.

Dimension Z is the distance from the intersection of center lines 20 and 24 to the right hand end of the sensing element 18e. The ratio of Dimension Z divided by Dimension Y will fall in the range of 3 to 6. This ratio is in fact the amplification factor of this invention.

Strain gauges 46, 48, 50 and 52 are generic industry standard load sensors that can be installed by bonding by methods known to those of skill in the art. The part number depicted is: CEA-06-125UN-350. The Manufacturer is Vishay/Measurements Group, Raleigh, N.C., USA.

In subsequent embodiment descriptions, the stress polarity encountered by each of the four gauges will remain constant. The strain gauge number will move to new and appropriate locations in alternative embodiments depicted in FIGS. 10, 11, and 12.

Figure 16:
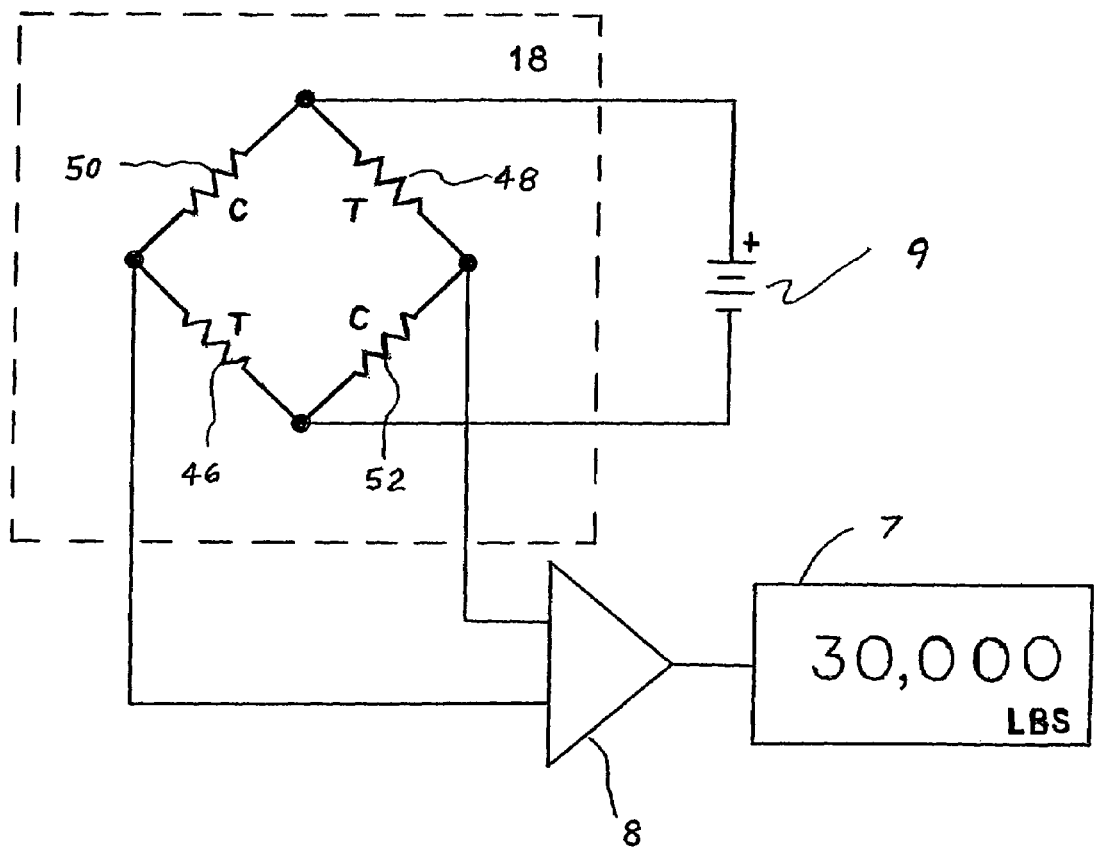
FIG. 16 is a functional diagram of four strain gauges wired in a wheatstone bridge with amplification, excitation power and digital display of load being monitored by the sensor beam.

The electrical portion of this system is depicted in FIG. 16. The source 9, the amplifier 8 and the digital load indicator 7 are all well known throughout the load sensor/load cell industry as is also the case with wiring and waterproofing techniques. None of the electrical portions is considered claimable and would add nothing to this invention.

FIG. 4 is a cross section of mounting hole 28 in FIG. 3. It has the aforementioned 4.5 degree taper 28a that matches the 36a taper in FIG. 5. The large diameter of taper 28a is facing inboard or towards the weld bracket 38b and axle housing 10.

FIG. 5 is a cross section of tapered bushing 36. Taper 36a has its large diameter facing inboard as does the taper in sensor beam 18. Inside diameter 36c of bushing 36 closely fits the shank diameter of bolt 34 in assembly 38.

FIG. 6 views the large diameter end of the FIG. 5 bushing. Note the 36b slot cut in bushing 36 to allow closure on the already close fit shoulder bolt shank 34.

FIG. 7 is a cross section of a backup washer 44. The recessed portion 46 faces sensor beam 18 at hole 28 and accommodates a portion of bushing 36 that protrudes through hole 28 during torque up.

FIG. 8 is a plan view of backup washer 44 viewed from the right side of FIG. 7. Washer 42 abuts backup washer 44. Lock nut 32 finishes the sequence of assembly for one of three attach points.

FIG. 9 is a side view of weld bracket 38. Shoulder bolt 34 is welded to bracket 38b with a small portion of 34's head outside of bracket 38b at point 34a. Shank 34c has been noted to close fit inside diameter 36e in bushing 36. Thread 34b passes through bushing 36, sensor beam 18 and backup washer 44 with sufficient remaining length to accommodate washer 42 and lock nut 32.

FIGS. 4, 5, 7 and 9 viewed together constitute an exploded view of one of three sensor beam 18 attachment points.

An alternative mounting technique utilizes tapered sleeves in tapered mounting holes at specified locations along a sensor beam body to secure the sensor beam to the primary structure. The sensor is mounted along a neutral axis of bending for the primary structure that becomes an arc of bending under applied load. The embodiment reverses the sequence of assembly from prior art, the primary structure of which places the small end of the tapered bushing outboard, thereby facilitating future disassembly. The placement of recessed backing washers outboard further improves the proximity of a sensor beam to the primary structure it is tracking during load defermation.

The depicted mounting brackets have greatly reduced thickness compared to those required by the prior art. They move the sensor beam closer to primary load bearing structures, thereby reducing bending stresses in the bolts that comprise the sensor piercing portion of the attachment brackets and subsequently improving sensor beam linearity and zero return.

Figure 10:
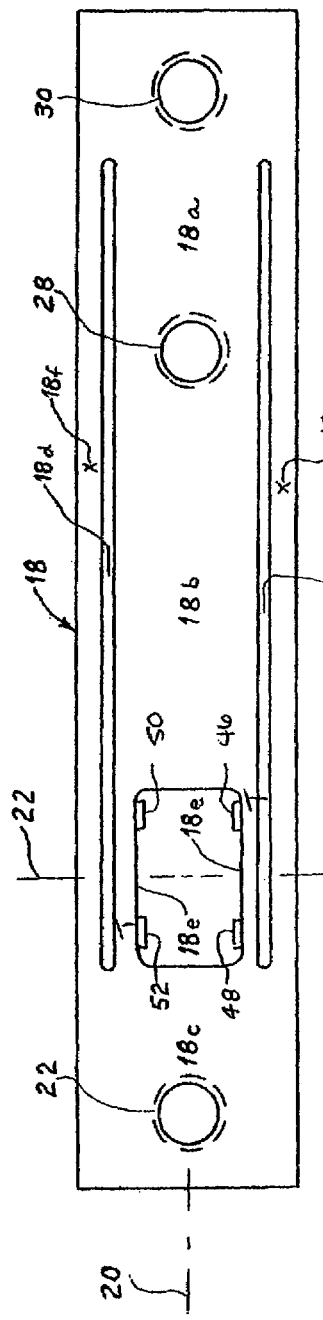
FIG. 10 is an enlarged plan view of a sensor beam with all of the attributes of the FIG. 3 sensor beam except that it suggests an alternate dual sensing element design.

FIG. 10 is an alternate embodiment of the invention. It shares the fit and general performance of the embodiment of FIG. 2, including its amplification factor. The primary variation lies in the configuration of sensing element 18e. In this embodiment, dual sensing elements are employed with strain gauges 52 and 46 on the inboard side of the upper element and strain gauges 48 and 50 on the inboard side of the lower elements. This facilitates waterproofing.

Figure 11:
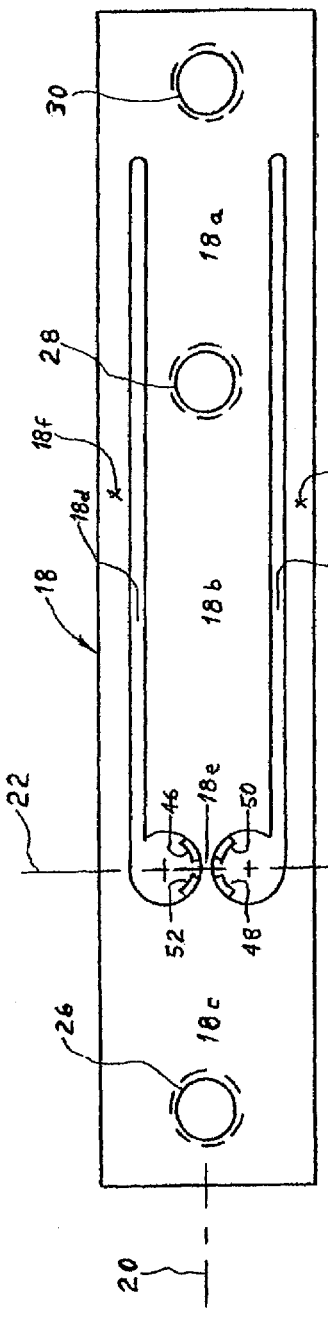
FIG. 11 is an enlarged plan view of a sensor beam with all of the attributes of the FIG. 3 sensor beam except that it suggests an alternate short sensing element design.

FIG. 11 is another alternate embodiment of the invention. It also shares the fit and general performance of the FIG. 2 design, including amplification factor. The sensing element 18e approaches the highest attainable amplification, a factor of 6.

Figure 12:
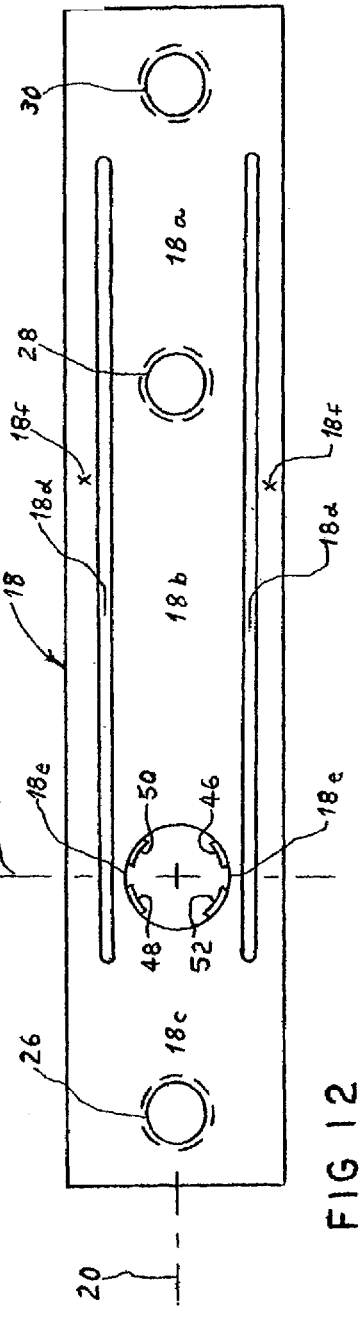
FIG. 12 is an enlarged plan view of a sensor beam with all of the attributes of die FIG. 3 sensor beam except that it suggests an alternate dual sensing element design made possible by a round center cutout versus a rectangular one as in FIG. 10.

FIG. 12 is another alternative embodiment of the invention. It also shares the fit and general performance of the FIG. 2 design, including amplification factor. As in FIG. 10, the FIG. 12 embodiment employs two sensing elements 18e, but creates them with one centered hole. As with FIG. 10, the strain gauges are physically protected and easy to waterproof. The installation costs of applying the strain gauges are kept low with the embodiments depicted in FIGS. 2, 10 and 12.

Figure 13:
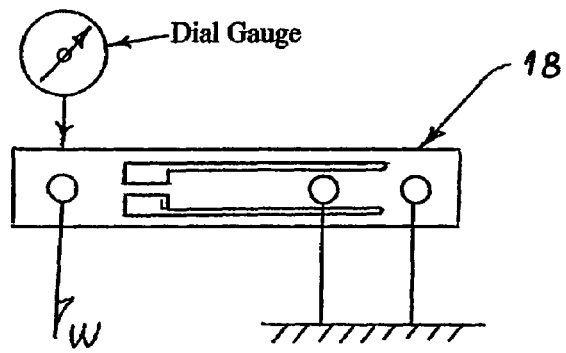
FIG. 13 is a table of applied forces versus sensor beam deflection and output signal for a test unit.

FIG. 13 represents test data taken from a FIG. 2 designed sensor beam. A target deflection is 0.0033 inches at the hole 26 end of the sensor beam 18. This modest deflection was produced with only 16 pounds of dead weight at hole 26. The demonstrated output of 1585 micro-inches per inch is 150% of that generated by the twelve-inch long sensors noted in U.S. Pat. No. 5,327,791.

Figure 14:
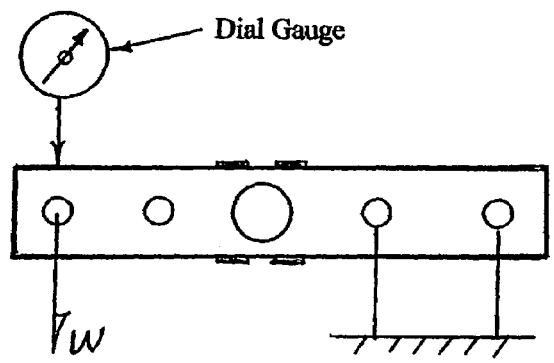
FIG. 14 is a table of applied forces versus sensor beam deflection and output signal for an interim design employing a center hole to form two sensor elements.

FIG. 14 represents test data taken from an interim design that utilizes the hole that appears in FIG. 12, but leaves said hole at the center of the sensor beam without any amplification. At the desired deflection of 0.0033 inches, the applied dead weight required was more than double the FIG. 13 weight required and the output signal was only 35% of the FIG. 13 design.

Figure 15:
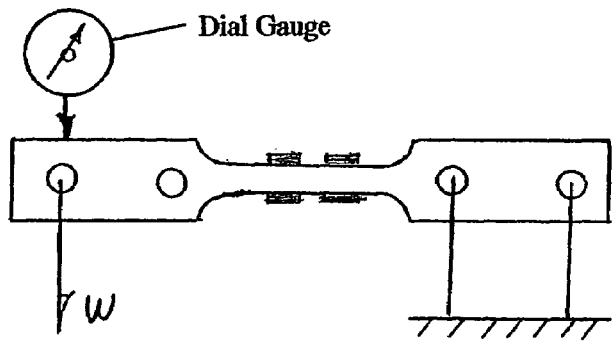
FIG. 15 is a table of applied forces versus sensor beam deflection and output signal for version of the prior art neutral axis sensor disclosed in U.S. Pat. No. 5,327,791.

FIG. 15 represents test data taken from a scaled down "dog bone" sensor beam, that being the industry name for the sensor of U.S. Pat. No. 5,327,791.

At the desired deflection of 0.003 3 inches at the hole 26 end of an eight-inch long dog bone, the dead weight required was less than 4 pounds, but the output of this sensor beam was only 335 micro-inches per inch or 20% of the FIG. 10 invention. It was also only about 33% of the output of the original twelve-inch dog bone sensor in U.S. Pat. No. 5,327,791.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A load sensor adapted for mounting on an axle, the axle having a neutral axis, and the axle deviating from the neutral axis when under a load, said load sensor comprising:

a reaction portion, said reaction portion being adapted for mounting at a point along the axle;

an active portion, said active portion being adapted for mounting at at least two points along said axle, said active portion having an amplifier arm;

at least one sensor element, said sensor element being attached at a first end to said reaction portion and said sensor element being attached to the second end to said amplifier arm;

at least one strain gauge mounted on said sensor element;

at least one flexion web, said flexion web being attached to said reaction portion and said flexion web being attached to said active portion;

wherein, when a load is put on the axle, flexion of the axle moves said active portion relative to the neutral axis of the axle, said active portion moves said amplifier arm, causing a curve to be formed in said sensor element, said curve being of sufficient magnitude to be calibrated by said at least one strain gauge, and wherein said at least one flexion web defines a slot between said at least one flexion web and said amplifier arm, each of said first and second flexible web extending beyond said first and second slot to a length substantially coextensive with said at least one sensor element.

2. The load sensor of claim 1 wherein a first sensor element and a second sensor element define an opening between said reaction portion and said amplifier arm.

3. The load sensor of claim 1 wherein said reaction portion is oriented to be mounted on the axle closer to a load than said active portion.

4. The load sensor of claim 1 wherein said at least two mounting points of said active portion define an active portion length, said active portion length and said load sensor has a ratio of an overall length to said active portion length substantially within the range of about 4 to 1 to about 5.3 to 1.

5. The load sensor of claim 4 wherein said overall length is substantially about eight inches and said active portion length is substantially about 1.9 inches.

6. The load sensor of claim 1 wherein said sensor element has a length and wherein an overall length of said load sensor to sensor element length is substantially in a range of about 6.6 to about 16.

7. The load sensor of claim 1 wherein an overall length of said load sensor is eight inches and said sensor element is substantially about 0.5 to about 1.2 inches long.

8. The load sensor of claim 1 wherein said amplifier arm has a length defined by a center of said active portion through an end of said amplifier arm attached to said second end of said sensing element and wherein a ratio of an amplifier arm length to said sensor element length is substantially in a range of about 3:1 to about 6:1.

9. A load sensor adapted for mounting on an axle, the axle having a neutral axis, and the axle deviating from the neutral axis when under a load, said load sensor comprising:

a reaction portion, said reaction portion being adapted for mounting at a point along the axle;

an active portion, said active portion being adapted for mounting at at least two points along said axle, said active portion having an amplifier arm;

at least one sensor element, said sensor element being attached at a first end to said reaction portion and said sensor element being attached to the second end to said amplifier arm;

at least one strain gauge mounted on said sensor element;

at least one flexion web, said flexion web being attached to said reaction portion and said flexion web being attached to said active portion and said flexion web defining an open space between said at least one flexion web and said sensor element;

wherein, when a load is put on the axle, flexion of the axle moves said active portion relative to the neutral axis of the axle, said active portion moves said amplifier arm, causing a curve to be formed in said sensor element, said curve being of sufficient magnitude to be calibrated by said at least one strain gauge.

10. The load sensor of claim 9 wherein said open space extends between said at least one flexion web and said amplifier arm.

11. The load sensor of claim 1 further comprising a second flexion web defining a second slot between said second flexion web and an opposite side of said amplifier arm.

12. The load sensor of claim 1 wherein said active portion is fixed at two holes.

13. The load sensor of claim 1 further comprising a tapered bushing adapted for close cooperation with a tapered hole in said load sensor, and said tapered bushing being dimensioned to fit on said bolt of a weld mount, nut and bolt assembly.

14. The load sensor of claim 1 wherein said reaction portion, active portion, amplifier arm, at least one sensor element and at least one flexion web are integrally formed.

15. The load sensor of claim 1 further comprising a second sensor element.

16. The load sensor of claim 1 further comprising a second flexion web.

17. The load sensor of claim 1 further comprising at least one other strain gauge.

18. The load sensor of claim 17 further wherein at least one of said strain gauges is a compression gauge and wherein at least one other of said strain gauges is a tension gauge.

* * * * *